United States Patent
Pastore et al.

(10) Patent No.: US 9,722,506 B2
(45) Date of Patent: Aug. 1, 2017

(54) LIMIT-TO-VALLEY RATIO CIRCUITRY IN POWER CONVERTERS

(71) Applicant: Power Integrations, Inc., San Jose, CA (US)

(72) Inventors: Tiziano Pastore, Los Gatos, CA (US); Sundaresan Sundararaj, Union City, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 14/859,028

(22) Filed: Sep. 18, 2015

(65) Prior Publication Data

US 2017/0085191 A1   Mar. 23, 2017

(51) Int. Cl.
| | | |
|---|---|---|
| *H02M 3/157* | (2006.01) | |
| *H02M 7/04* | (2006.01) | |
| *H02M 1/42* | (2007.01) | |
| *H02M 3/158* | (2006.01) | |

(52) U.S. Cl.
CPC ............ *H02M 7/04* (2013.01); *H02M 1/42* (2013.01); *H02M 1/4208* (2013.01); *H02M 3/158* (2013.01); *H02M 3/1582* (2013.01)

(58) Field of Classification Search
CPC .............................. H02M 3/156; H02M 3/157
USPC ................ 323/282, 283, 284, 285, 286, 287
See application file for complete search history.

(56) References Cited

U.S. PATENT DOCUMENTS

| | | |
|---|---|---|
| 6,944,034 B1 | 9/2005 | Shteynberg et al. |
| 7,554,821 B1 | 6/2009 | Collmeyer et al. |
| 2008/0246447 A1* | 10/2008 | Djenguerian ..... H02M 3/33523 323/234 |
| 2012/0300517 A1* | 11/2012 | Zhang ................. H02M 1/4225 363/84 |
| 2013/0249511 A1 | 9/2013 | Kalje et al. |

(Continued)

FOREIGN PATENT DOCUMENTS

EP   2458722 A1   5/2012

OTHER PUBLICATIONS

"NCL30002: Power Factor Corrected Buck LED Driver", Rev. 0, Semiconductor Components Industries, LLC, Mar. 2012, 18 pages; http://onsemi.com.

(Continued)

*Primary Examiner* — Jeffrey Sterrett
(74) *Attorney, Agent, or Firm* — Christensen O'Connor Johnson Kindness PLLC (57) ABSTRACT

A controller for a switched mode power converter includes limit-to-valley ratio circuitry, an on-time generator, and a drive circuit. The limit-to-valley ratio circuitry is coupled to generate a ratio signal in response to sensing a switch current of a switch that regulates an output of the switched mode power converter. The ratio signal is representative of a time ratio between a first length of time that the switch current is at or above a switch current limit and a second length of time that the switch current is at or below a switch current valley that is a portion of the switch current limit. The on-time generator is coupled to vary a switch on-time signal in response to receiving the ratio signal. The drive circuit is coupled to output a drive signal to a control terminal of the switch in response to receiving the switch on-time signal.

26 Claims, 7 Drawing Sheets

(56) References Cited

U.S. PATENT DOCUMENTS

| | | | |
|---|---|---|---|
| 2014/0159689 A1* | 6/2014 | Chen .................... | H02M 3/156 |
| | | | 323/282 |
| 2014/0197811 A1* | 7/2014 | Qiu .................... | H02M 3/1582 |
| | | | 323/282 |
| 2015/0236597 A1* | 8/2015 | Hinz .................... | H02M 1/08 |
| | | | 363/21.17 |

OTHER PUBLICATIONS

Keogh, B. et al., "Design Considerations for High Efficiency Buck PFC with Half-Bridge Regulation Stage", 2010 Twenty-Fifth Annual IEEE Applied Power Electronics Conference and Exposition (APEC), © IEEE, 2010, pp. 1384-1391.
EP Patent Application No. 16187398.9—Extended European Search Report, dated Mar. 1, 2017, 8 pages.

* cited by examiner

| LOOK UP TABLE ADDRESS | ON-TIME THRESHOLD, $U_{TON\_M}$ |
| --- | --- |
| 0 | $U_{TON\_M}(0)$ |
| 1 | $U_{TON\_M}(1) = U_{TON\_M}(0) + Z\%U_{TON\_M}(0)$ |
| 2 | $U_{TON\_M}(2) = U_{TON\_M}(1) + Z\%U_{TON\_M}(1)$ |
| ......... | |
| n | $U_{TON\_M}(n) = U_{TON\_M}(n-1) + Z\%U_{TON\_M}(n-1)$ |
| n+1 | $U_{TON\_M}(n+1) = U_{TON\_M}(n) + Z\%U_{TON\_M}(n)$ |

LIMIT-TO-VALLEY RATIO CIRCUITRY IN POWER CONVERTERS

TECHNICAL FIELD

This disclosure relates generally to power converters, and in particular to power converters.

BACKGROUND INFORMATION

Electronic devices use power to operate. Switched mode power converters are commonly used due to their high efficiency, small size and low weight to power many of today's electronics. Conventional wall sockets provide a high voltage alternating current. In a switching power converter, a high voltage alternating current (ac) input is converted to provide a well regulated direct current (dc) output through an energy transfer element to a load. In operation, a switch is utilized to provide the desired output by varying the duty cycle (typically the ratio of the ON time of the switch to the total switching period), varying the switching frequency, or varying the number of pulses per unit time of the switch in a power converter.

The power converter also includes a controller. The controller may control the switch in response to a sensed parameter of the power converter. Properties, such as efficiency, size, weight and cost are usually taken into account when designing a power converter and controller. Power converters and controllers may also be designed to meet standards set by regulatory agencies. For example, wall sockets provide an ac voltage which has a waveform conforming to standards of magnitude, frequency, and harmonic content. However, the characteristics of the current waveform drawn from the wall socket are determined by the power converter which receives the ac voltage. Regulatory agencies may set limits on magnitudes of specific frequency components of an ac current or limit the rms value of the current in accordance with the amount of power the wall socket provides. Power factor and total harmonic distortion (THD) may be used as measurements to determine if a power converter is meeting the standards set by regulatory agencies.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a power converter, a controller for a power converter, and a method of operating a power converter are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Power converters and controllers may be designed to maximize power factor and limit total harmonic distortion (THD). Power factor may be a measure of how closely the input ac current approaches the ideal. In other words, the power factor is the power from the outlet divided by the product of the rms current multiplied by the rms voltage. THD may be the ratio of the sum of the powers of all harmonic components of the power converter to the power of the fundamental frequency.

As mentioned, the power converter may provide an output through an energy transfer element utilizing a switch. The controller may control one or more parameters of the switch (such as on-time, off-time, duty cycle or the number of pulses per unit time) in response to one or more parameters of the power converter. In one example, a controller with power factor correction (PFC) may operate in critical conduction mode. For critical conduction mode, the switch is turned on once the current in the energy transfer element has substantially reached zero. In one example, the switch is turned off when the on-time of the switch has reached an on-time limit or the switch current has reached the current limit.

For small values of the input voltage, the on-time threshold is generally reached before the switch current has reached the current limit. For large values of the input voltage, the switch current has generally reached the current limit before the on-time has reached an on-time threshold. The shape of the envelope of the peak switch current may be triangular, trapezoidal, or rectangular and may be partially determined by either the on-time threshold, current limit, or both. For example, a lower current limit may result in a rectangular shaped envelope while a large current limit may result in a triangular shaped envelope. A longer on-time threshold may result in a more rectangular shaped envelope while a shorter on-time threshold may result in a triangular shaped envelope. Greater output power may be delivered when the envelope shape is more rectangular, however THD may increase.

The envelope of the peak switch current may be characterized by the length of time which the peak switch current is substantially equal to the current limit and the length of time which the peak switch current is less than the valley limit. In one example, the valley limit is a percentage of the current limit. The length of time which the peak switch current is substantially equal to the current limit may be referred to as the limit section while the length of time which the peak switch current is less than the valley section may be referred to as the valley section. A larger ratio of the limit to valley section may correspond to greater power delivery but high THD as compared to a smaller ratio of the limit to valley section. Examples of the present invention may determine the ratio between the limit section and valley section. If the ratio is greater than a value, the on-time threshold may be decreased. If the ratio is less than the value, the on-time threshold may be increased. As such, the controller controls the switch such that the ratio of the limit section to valley section may be regulated to the value.

Figure 1:
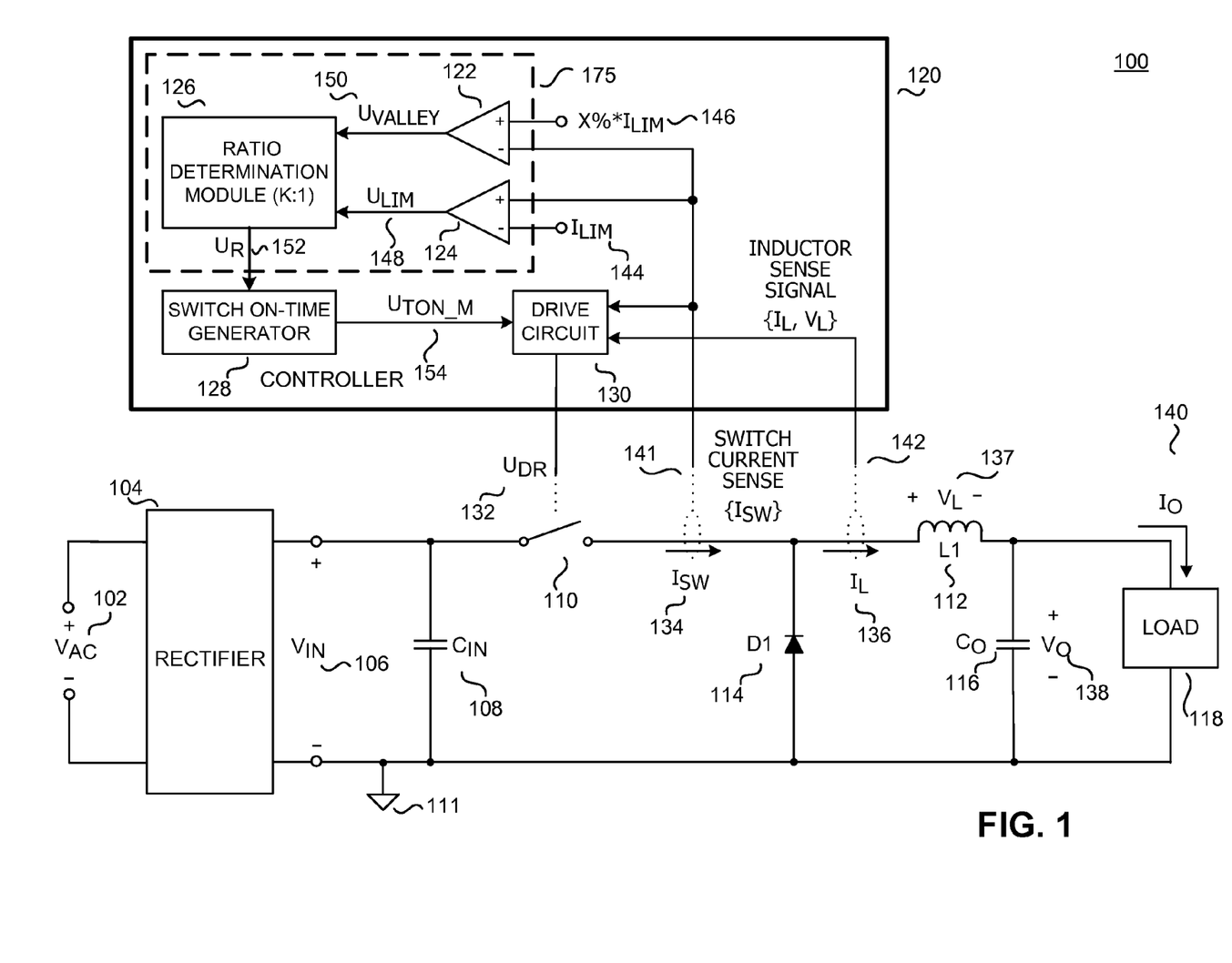
FIG. 1 is a functional block diagram of an example power converter and controller for determining an on-time threshold in response to the ratio between a limit section and a valley section, in accordance with an embodiment of the disclosure.

FIG. 1 illustrates a functional block diagram of an example power converter 100 that includes a rectifier 104, an input capacitor $C_{IN}$ 108, an input return 111, a power switch 110, an energy transfer element 112 (exemplified as an inductor L1), a freewheeling diode D1 114, an output capacitor $C_O$ 116, and a controller 120. The controller 120 is further illustrated as including limit-to-valley ratio circuitry 175, a switch on-time generator block 128, and a drive circuit 130. Limit-to-valley ratio circuitry 175 includes comparators 122 and 124, and a limit to valley ratio determination block 126. Further illustrated in FIG. 1 are an input voltage $V_{AC}$ 102, an input voltage $V_{IN}$ 106, a switch current $I_{SW}$ 134, a drive signal $U_{DR}$ 132, an inductor current $I_L$ 136, an inductor voltage $V_L$ 137, an output voltage $V_O$ 138, an output current $I_O$ 140, a switch current sense 141, an inductor sense signal 142, a current limit $I_{LIM}$ 144, a valley limit $X\%*I_{LIM}$ 146, a limit signal $U_{LIM}$ 148, a valley signal $U_{VALLEY}$ 150, a ratio signal $U_R$ 152, and an on-time threshold $U_{TON\_M}$ 154. The power converter 100 is coupled as a non-isolated buck converter. However, other power converter topologies or configurations may benefit from the teachings of the present disclosure. In addition, while the power converter is illustrated as a non-isolated power converter (e.g. dc current is able to flow between the input and the output of the power converter 100), it should be appreciated that isolated power converters may also be used.

The power converter 100 provides output power to the load 119 from an unregulated input voltage (e.g., the ac input voltage $V_{AC}$ 102 or the input voltage $V_{IN}$ 106). As shown, the rectifier 104 receives and rectifies the ac input voltage $V_{AC}$ 102 to produce the input voltage $V_{IN}$ 106. The input capacitor $C_{IN}$ 108 is coupled to the rectifier 104 and filters the high frequency current from the power switch 110. For some applications, the input capacitor $C_{IN}$ 108 may be large enough such that the input voltage $V_{IN}$ 106 is a substantially dc voltage for every line cycle. However, for power supplies with power factor correction (PFC) or for driving an LED load, a small input capacitor $C_{IN}$ 108 may be utilized to allow the input voltage $V_{IN}$ 106 to substantially follow the rectified ac input voltage $V_{AC}$ 102.

The input capacitor $C_{IN}$ 108 is coupled to one end of the power switch 110. The other end of the power switch 110 is coupled to the energy transfer element L1 112 and the freewheeling diode D1 114. Both the energy transfer element L1 112 and the freewheeling diode D1 114 are coupled to the output capacitor $C_O$ 116. An output is provided to the load 118 and may be provided as either an output voltage $V_O$ 138, output current $I_O$ 140, or a combination of the two. In one example, the load 118 may include an LED, an LED module, or an LED array.

The power converter 100 further includes circuitry to sense the energy transfer element L1 112 and provide the inductor sense signal 142, which is representative of the inductor current $I_L$ 136, inductor voltage $V_L$ 137, or both. The power converter 100 may also include circuitry to sense the switch current $I_{SW}$ 134 and provide the switch current sense signal 141, which is representative of the switch current $I_{SW}$ 134. In particular, the switch current sense signal 141 may be representative of the peak switch current $I_{SW}$ 134. The inductor sense signal 142 may also be representative of the switch current $I_{SW}$ 134 and/or peak switch current $I_{SW}$ 134. In the example shown, the inductor current $I_L$ 136 is substantially equal to the switch current $I_{SW}$ 134 when the power switch 110 is conducting. The controller 120 is illustrated as receiving both the inductor sense signal 142 and the switch current sense signal 141, however, the received switch current sense signal 141 may be optional as the inductor sense signal 142 may also be representative of the switch current $I_{SW}$ 134.

Controller 120 provides drive signal $U_{DR}$ 132 to the power switch 110 to control various switching parameters of the power switch 110 to control the transfer of energy from the input to the output of power converter 100. Examples of such parameters may include switching frequency, switching period, duty cycle, respective ON and OFF times of the power switch 110, or varying the number of pulses per unit time of the power switch 110. In one example, the switch 110 may be a transistor such as a metal-oxide-semiconductor field-effect transistor (MOSFET). In another example, controller 120 may be implemented as a monolithic integrated circuit or may be implemented with discrete electrical components or a combination of discrete and integrated components. Controller 120 and power switch 110 can form part of an integrated circuit that is manufactured as either a hybrid or monolithic integrated circuit.

Controller 120 further includes comparators 122 and 124, limit to valley ratio determination block 126, switch on-time generator 128, and drive circuit 130. Comparators 122 and 124 are coupled to receive the switch current sense signal 141 (at the inverting and non-inverting inputs, respectively). However, the inductor sense signal 142 may also be representative of the switch current $I_{SW}$ 134. As such, the comparators 122 and 124 may receive the inductor sense signal 142 instead of the switch current sense signal 141. As illustrated, valley comparator 122 also receives the valley limit $X\%*I_{LIM}$ 146 while limit comparator 124 receives the current limit $I_{LIM}$ 144 (at the non-inverting and inverting inputs, respectively). In one example, the valley limit $\%*I_{LIM}$ 146 may be some percentage amount of the current limit $I_{LIM}$ 144. For example, the valley limit 146 may be X % of the current limit 144. In one example, the valley limit 146 may be 30% of the current limit 144. Valley comparator 122 outputs the valley signal $U_{VALLEY}$ 150 while the limit comparator 124 outputs the limit signal $U_{LIM}$ 148. The limit to valley ratio determination block 126 is coupled to receive the valley signal $U_{VALLEY}$ 150 and the limit signal $U_{LIM}$ 148 and outputs the ratio signal $U_R$ 152 in response to the valley signal $U_{VALLEY}$ 150 and the limit signal $U_{LIM}$ 148. The switch on-time generator 128 is coupled to receive the ratio signal $U_R$ 152 and outputs the on-time threshold $U_{TON\_M}$ 154 in response to the ratio signal $U_R$ 152. As illustrated, the drive circuit 130 may be coupled to receive the on-time threshold $U_{TON\_M}$ 154 and the inductor sense signal 142 and may output the drive signal $U_{DR}$ 132 in response to the on-time threshold $U_{TON\_M}$ 154 and the inductor sense signal 142. Further, the drive signal $U_{DR}$ 132 may also be coupled to receive and be responsive to the switch current sense signal 141. Switch 110 may be coupled to receive drive signal $U_{DR}$ 132 at a control terminal (e.g. gate) of switch 110.

In operation, limit-to-valley ratio circuitry 175 generates ratio signal $U_R$ 152 in response to sensing a switch current of the switch. In particular, comparators 122 and 124 compare the switch current $I_{SW}$ 134 (provided by the switch current sense signal 141) to the valley limit X %*$I_{LIM}$ 146 and the current limit $I_{LIM}$ 144. Both the valley signal $U_{VALLEY}$ 150 and the limit signal $U_{LIM}$ 148 may be rectangular pulse waveforms with varying lengths of logic high and logic low sections. In the example shown, the valley signal $U_{VALLEY}$ 150 is logic high when the peak switch current $I_{SW}$ 134 is less than the valley limit X %*$I_{LIM}$ 146 (referred to as the valley section) while the limit signal $U_{LIM}$ 148 is logic high when the peak switch current $I_{SW}$ 134 is greater than or equal to the current limit $I_{LIM}$ 144 (referred to as the limit section). As such, the valley signal $U_{VALLEY}$ 150 may be representative of the length of time which the peak switch current $I_{SW}$ 134 is less than the valley limit X %*$I_{LIM}$ 146 while the limit signal $U_{LIM}$ 148 may be representative of the length of time which the peak switch current $I_{SW}$ 134 is greater than or equal to the current limit $I_{LIM}$ 144.

The limit to valley ratio determination block 126 determines the ratio (K:1) between the length of time which the limit signal $U_{LIM}$ 148 is logic high and the length of time which valley signal $U_{VALLEY}$ 150 is logic high. In other words, the limit to valley ratio determination block 126 determines the ratio between the length of time which the peak switch current $I_{SW}$ 134 is greater than or equal to the current limit $I_{LIM}$ 144 to the length of time which peak switch current $I_{SW}$ 134 is less than the valley limit X %*$I_{LIM}$ 146. The determined ratio is outputted as the ratio signal $U_R$ 152 to the switch on-time generator 128. Hence, ratio signal $U_R$ 152 is representative of a time ratio between a first length of time that the switch current is at or above a switch current limit and a second length of time that the switch current is at or below a switch current valley that is a portion of the switch current limit. Further, the limit to valley ratio determination block 126 may also determine if the ratio is greater than or less than a set value, K:1. The outputted ratio signal $U_R$ 152 may also indicate if the determined ratio, is greater than or less than the set value, K:1.

The switch on-time generator 128 may increase or decrease the on-time threshold $U_{TON\_M}$ 154 in response to the received ratio signal $U_R$ 152. In one example, the on-time threshold $U_{TON\_M}$ 154 may be decreased if the determined ratio is greater than the set value, K:1. The on-time threshold $U_{TON\_M}$ 154 may be increased if the determined ratio is less than the set value, K:1. The envelope of the peak switch current $I_{SW}$ 134 may be characterized by the ratio between the limit section and the valley section. A larger ratio of the limit to valley section may correspond to greater power delivery but high THD as compared to a smaller ratio of the limit to valley section. The ratio may be regulated to the set value, K:1, which may be a predetermined value selected by a designer. As will be further discussed, in one example the value K may be set by setting the speed at which a timer counts. In another example, the value K may be set as a threshold. In another example, the value K may be stored as a digital word. By increasing or decreasing the on-time threshold $U_{TON\_M}$ 154, the ratio between the limit section and the valley section may be regulated. For example, an increase in the on-time threshold $U_{TON\_M}$ 154 may result in an increase in the ratio between the limit section and the valley section while a decrease in the on-time threshold $U_{TON\_M}$ 154 may result in a decrease of the ratio between the limit section and the valley section.

The drive circuit 130 may output the drive signal $U_{DR}$ 132 in response to the on-time threshold $U_{TON\_M}$ 154, inductor sense signal 142, and switch current sense signal 141. The drive signal $U_{DR}$ 132 may be a rectangular pulse waveform of varying lengths of logic high and logic low sections. In one example, when the drive signal $U_{DR}$ 132 is logic high, the power switch 110 is on and vice versa. The controller 120 may operate in critical mode and turn on the power switch 110 when the energy across the energy transfer element L1 112 is substantially zero. Drive circuit 130 may determine that the energy across the energy transfer element L1 112 is substantially zero when the inductor current $I_L$ 136 or the inductor voltage $V_L$ 137 is substantially equal to zero. In one example, the drive circuit may turn on the power switch 110 when the inductor current $I_L$ 136 or the inductor voltage $V_L$ 137 (provided by the inductor sense signal 142) is less than a threshold. The drive circuit 130 turns off the power switch 110 when the sensed switch current $I_{SW}$ 134 (which may be provided by the inductor sense signal 142 or the switch current sense signal 141) has reached the current limit $I_{LIM}$ 144 or the on-time of the power switch 110 has reached the on-time threshold $U_{TON\_M}$ 154. As such, increasing or decreasing of the on-time threshold $U_{TON\_M}$ 154, may regulate the ratio between the limit section and the valley section.

Figure 2A:
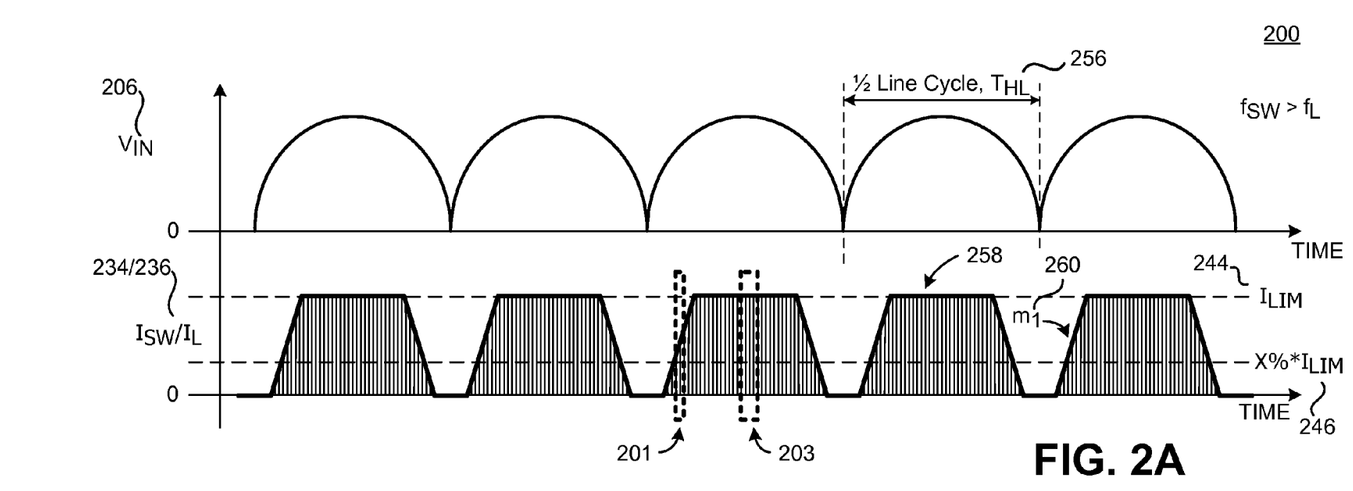
FIG. 2A is a diagram illustrating example waveforms of an input voltage, a switch current, and an inductor current of FIG. 1, in accordance with an embodiment of the disclosure.

FIG. 2A illustrates a timing diagram 200 of example waveforms of the input voltage $V_{IN}$ 206, switch current $I_{SW}$ 234, and inductor current $I_L$ 236. Further shown in FIG. 2A are the current limit $I_{LIM}$ 244, valley limit X %*$I_{LIM}$ 246, half line cycle $T_{HL}$ 256, an envelope 258, and a slope $m_1$ 260. The input voltage $V_{IN}$ 206, switch current $I_{SW}$ 234, and inductor current $I_L$ 236, current limit $I_{LIM}$ 244, and valley limit X %*$I_{LIM}$ 246 may be one example of similarly named and numbered elements discussed with respect to FIG. 1. Windows 201 and 203 are further illustrated with respect to FIGS. 2B and 2C.

In general, the ac input voltage $V_{AC}$ is a sinusoidal waveform having a period that is referred to as a full line cycle $T_{FL}$. Mathematically: $V_{AC}=V_P \sin(2\pi f_L t)$, where $V_P$ is the peak voltage of the ac input voltage $V_{AC}$ and $f_L$ is the frequency of the ac input voltage $V_{AC}$. The input voltage $V_{IN}$ 206 illustrated is substantially the rectified ac input voltage $V_{AC}$, or mathematically: $V_{IN}=|V_P \sin(2\pi f_L t)|$. It should be appreciated that the full line cycle $T_{FL}$ is the reciprocal of the line frequency $f_L$, or mathematically:

$$T_{FL} = \frac{1}{f_L}.$$

Further, the half line cycle $T_{HL}$ 256 is the reciprocal of double the line frequency, or mathematically:

$$T_{HL} = \frac{1}{2f_L}.$$

As illustrated, the input voltage $V_{IN}$ 206 substantially reaches zero and the half line cycle $T_{HL}$ 256 may be the length of time between two subsequent near zero crossings.

The switch current $I_{SW}$ 234 and the inductor current $I_L$ 236 are generally triangular waveforms, however, they are illustrated as thin lines since the switch frequency $f_{SW}$ of the switch current $I_{SW}$ 234 and the inductor current $I_L$ 236 is greater than the line frequency $f_L$ and double the line frequency $2f_L$. The bolder line denotes the envelope 258, which is defined by the peak allowed value of the switch current $I_{SW}$ 234 and the inductor current $I_L$ 236. Further, for the power converter 100 illustrated with respect to FIG. 1, the inductor current $I_L$ 236 is substantially equal to the switch current switch current $I_{SW}$ 234 when the power switch 110 is on and conducting.

The envelope 258 shown is substantially trapezoidal in shape. However, the envelope may also be rectangular or triangular. As mentioned above, the shape of the envelope 258 may be characterized by the value of the current limit $I_{LIM}$ 244 and an on-time threshold $T_{ON\_M}$ 254, illustrated further with respect to FIGS. 2B and 2C. For example, a lower current limit current limit $I_{LIM}$ 244 may result in a rectangular shaped envelope while a large current limit $I_{LIM}$ 244 may result in a triangular shaped envelope. A longer on-time threshold on-time threshold $T_{ON\_M}$ 254 may result in a more rectangular shaped envelope while a shorter on-time threshold $T_{ON\_M}$ 254 may result in a triangular shaped envelope. The shape of the envelope 258 may also be characterized by the length of times which the peak value of the switch current $I_{SW}$ 234 or the inductor current $I_L$ 236 is substantially equal to the current limit $I_{LIM}$ 244 and less than the valley limit X %*$I_{LIM}$ 246. Further, the envelope 258 may have sections which the envelope is substantially constant, substantially increasing with slope $m_1$ 260, or substantially decreasing. In one example, the envelope substantially decreases with slope $-m_1$.

Figure 2B:
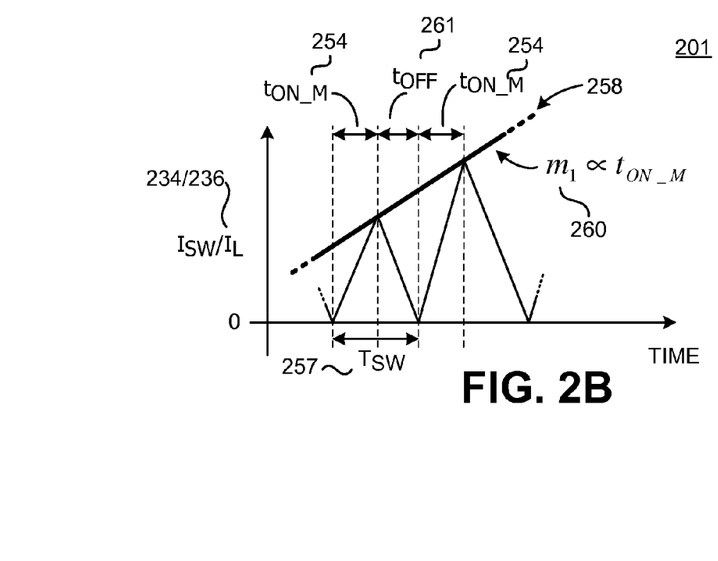
FIG. 2B is a diagram further illustrating an example switch current and inductor current of FIG. 2A, in accordance with an embodiment of the disclosure.

FIG. 2B illustrates the switch current $I_{SW}$ 234 and inductor current $I_L$ 236 for the window 201 in FIG. 2A. When the envelope 258 is increasing or decreasing, the controller may be operating in a constant on-time mode. The power switch turns on and the switch current $I_{SW}$ 234 and inductor current $I_L$ 236 increases. The rate at which the switch current $I_{SW}$ 234 and inductor current $I_L$ 236 increases is proportional to the difference between the input voltage $V_{IN}$ and output voltage $V_O$ for the power converter illustrated in FIG. 1. For the example window 201 shown, the on-time threshold $t_{ON\_M}$ 254 is reached before the switch current $I_{SW}$ 234 and inductor current $I_L$ 236 reach the current limit $I_{LIM}$ 244. This is partially due to the value of the input voltage $V_{IN}$ 206. As such, the on-time of the power switch 110 is substantially equal to the on-time threshold $t_{ON\_M}$ 254.

Once the switch turns off, the switch current $I_{SW}$ 234 is substantially equal to zero and the inductor current $I_L$ 236 begins to decrease. For a power converter and controller operating in critical conduction mode, the power switch turns on once there is no energy in the energy transfer element. As illustrated in FIG. 2B, the power switch turns on once the inductor current $I_L$ 236 reaches zero and the switch current $I_{SW}$ 234 and inductor current $I_L$ 236 begin to increase again. For FIG. 2B, the off-time $T_{OFF}$ 261 is the amount of time it takes for the inductor current $I_L$ 236 to substantially reach zero. The rate which the inductor current decreases is partially due to the value of the output voltage $V_O$. The switching period $T_{SW}$ 257 is illustrated as the sum of the on-time $T_{ON}$ (which is substantially equal to the on-time threshold $t_{ON\_M}$ 254) and off-time $T_{OFF}$ 261 of the power switch. The switching period $T_{SW}$ 257 is much shorter than the half line cycle $T_{HL}$ 256. Similarly for the portions of the envelope 258 which decreases, the on-time of the power switch is substantially equal to the on-time threshold $T_{ON\_M}$ 254.

The envelope 258 of the peak value of the switch current $I_{SW}$ 234 and inductor current $I_L$ 236 is illustrated as increasing with slope $m_1$ 260. The value of slope $m_1$ 260 is proportional to the on-time threshold $T_{ON\_M}$ 254. In one example, the slope $m_1$ 260 increases as the on-time threshold $T_{ON\_M}$ 254 increases. As mentioned above, in one embodiment the value of the on-time threshold $T_{ON\_M}$ 254 may be varied in response to the ratio between the length of times which the peak value of the switch current $I_{SW}$ 234 or the inductor current $I_L$ 236 is substantially equal to the current limit $I_{LIM}$ 244 and less than the valley limit X %*$I_{LIM}$ 246. For example, the on-time threshold $T_{ON\_M}$ 254 may be decreased if the ratio is greater than a set value, K, and increased if the ratio is less than a set value, K.

Figure 2C:
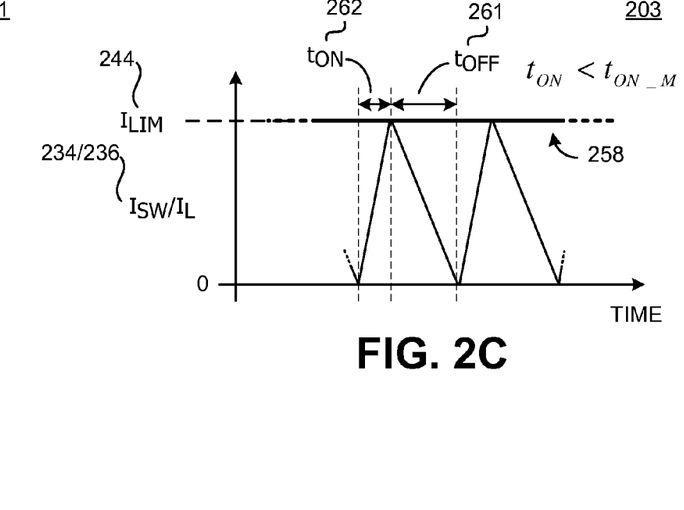
FIG. 2C is another diagram further illustrating an example switch current and inductor current of FIG. 2A, in accordance with an embodiment of the disclosure.

FIG. 2C illustrates the switch current $I_{SW}$ 234 and inductor current $I_L$ 236 for the window 203 in FIG. 2A. When the envelope 258 is substantially equal to the current limit $I_{LIM}$ 244, the controller may be operating in a constant current mode. The characteristics of the switch current $I_{SW}$ 234 and inductor current $I_L$ 236 shown in FIG. 2C are similar to the characteristics of the switch current $I_{SW}$ 234 and inductor current $I_L$ 236 shown in FIG. 2B, however, the switch current $I_{SW}$ 234 and inductor current $I_L$ 236 reach the current limit $I_{LIM}$ 244 before the on-time threshold $T_{ON\_M}$ 254 is reached. As such, the on-time $T_{ON}$ 262 is less than the on-time threshold $T_{ON\_M}$ 254. This is partially due to the value of the input voltage $V_{IN}$ 206. The larger value of the input voltage YIN 206, the more likely the current limit $I_{LIM}$ 244 is reached before the on-time threshold $T_{ON\_M}$ 254.

Figure 3:
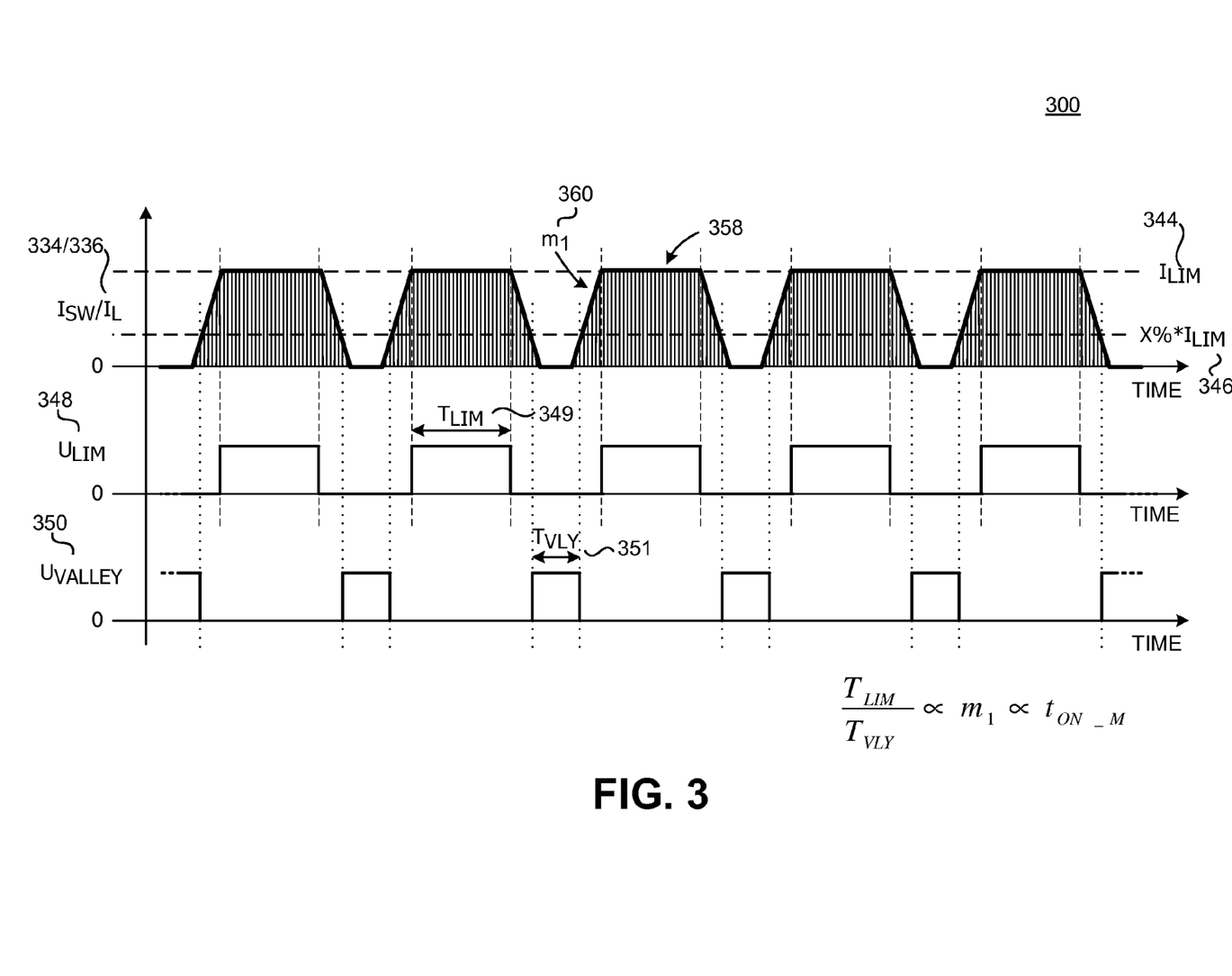
FIG. 3 is a diagram illustrating example waveforms of the switch current, inductor current, limit signal, and valley signal of FIG. 1, in accordance with an embodiment of the disclosure.

FIG. 3 illustrates a timing diagram 300 of example waveforms of the switch current $I_{SW}$ 334, inductor current $I_L$ 336, limit signal $U_{LIM}$ 348 and valley signal $U_{VALLEY}$ 350. Further shown in FIG. 3 are the current limit $I_{LIM}$ 344, valley limit X %*$I_{LIM}$ 346, envelope 358, slope $m_1$ 360, a limit section $T_{LIM}$ 349, and a valley section $T_{VLY}$ 351. The switch current $I_{SW}$ 334, inductor current $I_L$ 336, limit signal $U_{LIM}$ 348, valley signal $U_{VALLEY}$ 350, current limit $I_{LIM}$ 344, valley limit X %*$I_{LIM}$ 346, envelope 358, slope $m_1$ 360, limit section $T_{LIM}$ 349, and valley section $T_{VLY}$ 351 may be one example of similarly named and numbered elements discussed with respect to FIGS. 1, 2A, 2B, and 2C.

The limit signal $U_{LIM}$ 348 and valley signal $U_{VALLEY}$ 350 may be outputted from comparators 124 and 122 illustrated in FIG. 1. As mentioned above, the comparators 122 and 124 compare the peak value of the switch current $I_{SW}$ 334 (or optionally the inductor current $I_L$ 336) to the valley limit X %*$I_{LIM}$ 346 and the current limit $I_{LIM}$ 344. In the example shown, the limit signal $U_{LIM}$ 348 is logic high when the peak value of the switch current $I_{SW}$ 334 (or optionally the inductor current $I_L$ 336) is substantially equal to the current limit $I_{LIM}$ 344. The length of time which the limit signal $U_{LIM}$ 348 is logic high may be referred to as the limit section $T_{LIM}$ 349. Or in other words, the limit section $T_{LIM}$ 349 may be the length of time which the peak value of the switch current $I_{SW}$ 334 is substantially equal to the current limit $I_{LIM}$ 344. In the example shown, the valley signal $U_{VALLEY}$ 350 is logic high when the peak switch current $I_{SW}$ 334 (or optionally the inductor current $I_L$ 336) is less than the valley limit X %*$I_{LIM}$ 346. The length of time which the valley signal $U_{VALLEY}$ 350 is logic high may be referred to as the valley section $T_{VLY}$ 351. Or in other words, the valley section $T_{VLY}$ 351 may be the length of time which the peak switch current $I_{SW}$ 334 is less than the valley limit X %*$I_{LIM}$ 346.

The slope $m_1$ 360 may be proportional to the ratio between the limit section $T_{LIM}$ 349 and the valley section $T_{VLY}$ 351 and the slope $m_1$ 360 may also be proportional to the on-time threshold $T_{ON\_M}$. As such, the on-time threshold $T_{ON\_M}$ may be proportional to the ratio between the limit section $T_{LIM}$ 349 and the valley section $T_{VLY}$ 351. Example embodiments may determine the ratio between the limit section $T_{LIM}$ 349 and the valley section $T_{VLY}$ 351 and vary the on-time threshold $T_{ON\_M}$. If the ratio is greater than a set value, K, the on-time threshold $T_{ON\_M}$ 254 may be decreased and vice versa and the ratio between the limit section $T_{LIM}$ 349 and the valley section $T_{VLY}$ 351 may be regulated to the set value.

Figure 4:
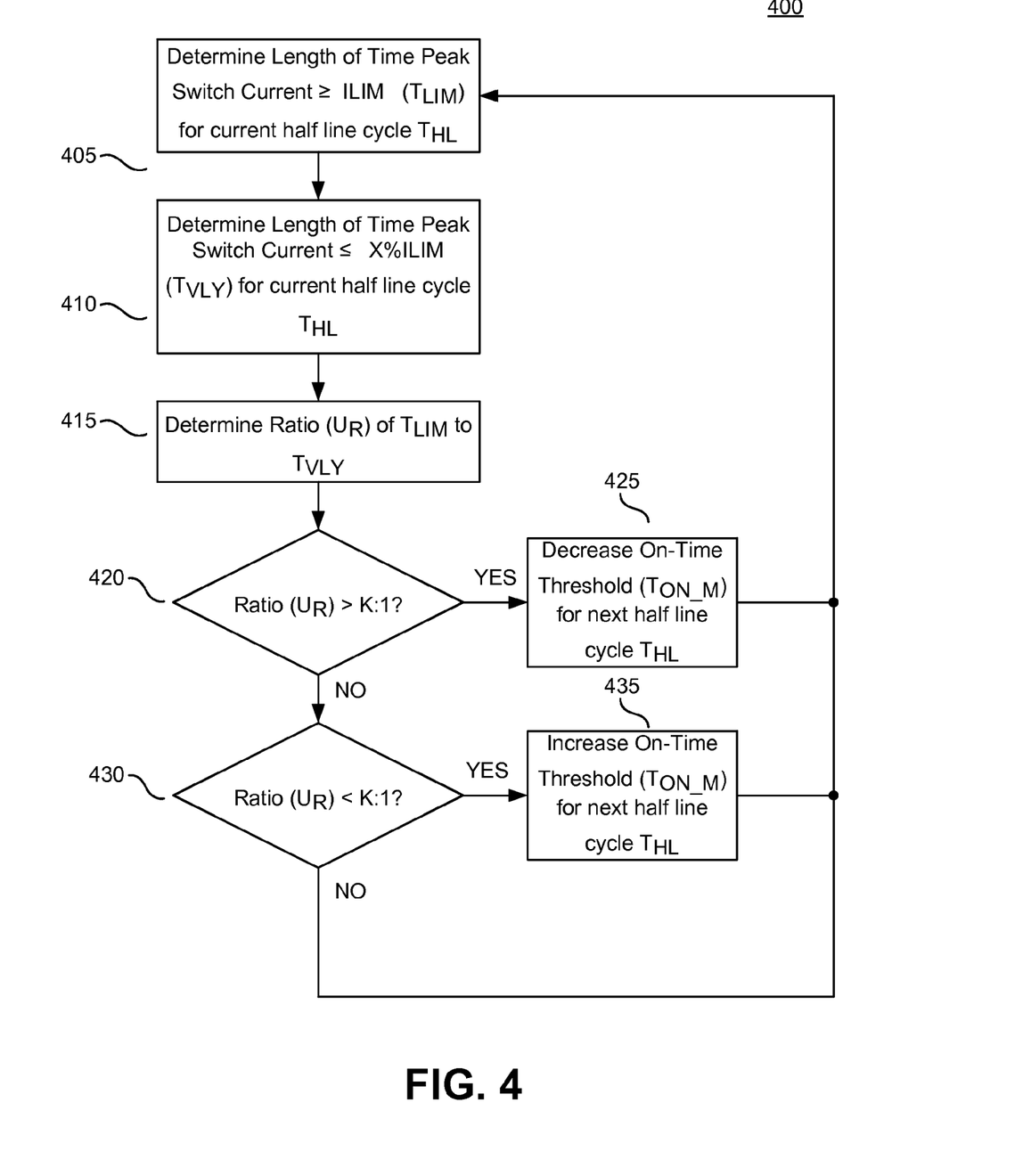
FIG. 4 is a flow diagram illustrating an example method of determining an on-time threshold in response to the ratio between a limit section and a valley section, in accordance with an embodiment of the disclosure.

FIG. 4 is a flow diagram illustrating an example process 400 of determining an on-time threshold $T_{ON\_M}$ in response to the ratio between a limit section $T_{LIM}$ and a valley section $T_{VLY}$, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

The process begins in block 405 where the length of time which the peak switch current $I_{SW}$ is greater than or equal to the current limit $I_{LIM}$ is determined for the current half line cycle $T_{HL}$, this length of time is also referred to as the limit section $T_{LIM}$. At block 410, the length of time which the peak switch current $I_{SW}$ is less than or equal to the valley limit X % $I_{LIM}$ is determined for the current half line cycle $T_{HL}$, this length of time is also referred to as the valley section $T_{VLY}$. At the next block 415, the ratio ($U_R$) between the limit section $T_{LIM}$ and valley section $T_{VLY}$ is determined.

The process continues to block 420 where it is determined if the ratio ($U_R$) is greater than the set value, K:1. If the ratio ($U_R$) is greater than the set value, K:1, the process continues to block 425 and the on-time threshold $T_{ON\_M}$ is decreased for the next half line cycle $T_{HL}$. Once the on-time threshold $T_{ON\_M}$ is decreased, the process returns to block 405.

However, if the ratio ($U_R$) is not greater than the set value, K:1, the process continues to block 430. At block 430, it is determined if the ratio ($U_R$) is less than the set value, K:1. If the ratio ($U_R$) is less than the set value, K:1, the process continues to block 435 and the on-time threshold $T_{ON\_M}$ is increased for the next half line cycle $T_{HL}$. Once the on-time threshold $T_{ON\_M}$ is increased, the process returns to block 405.

Figure 5:
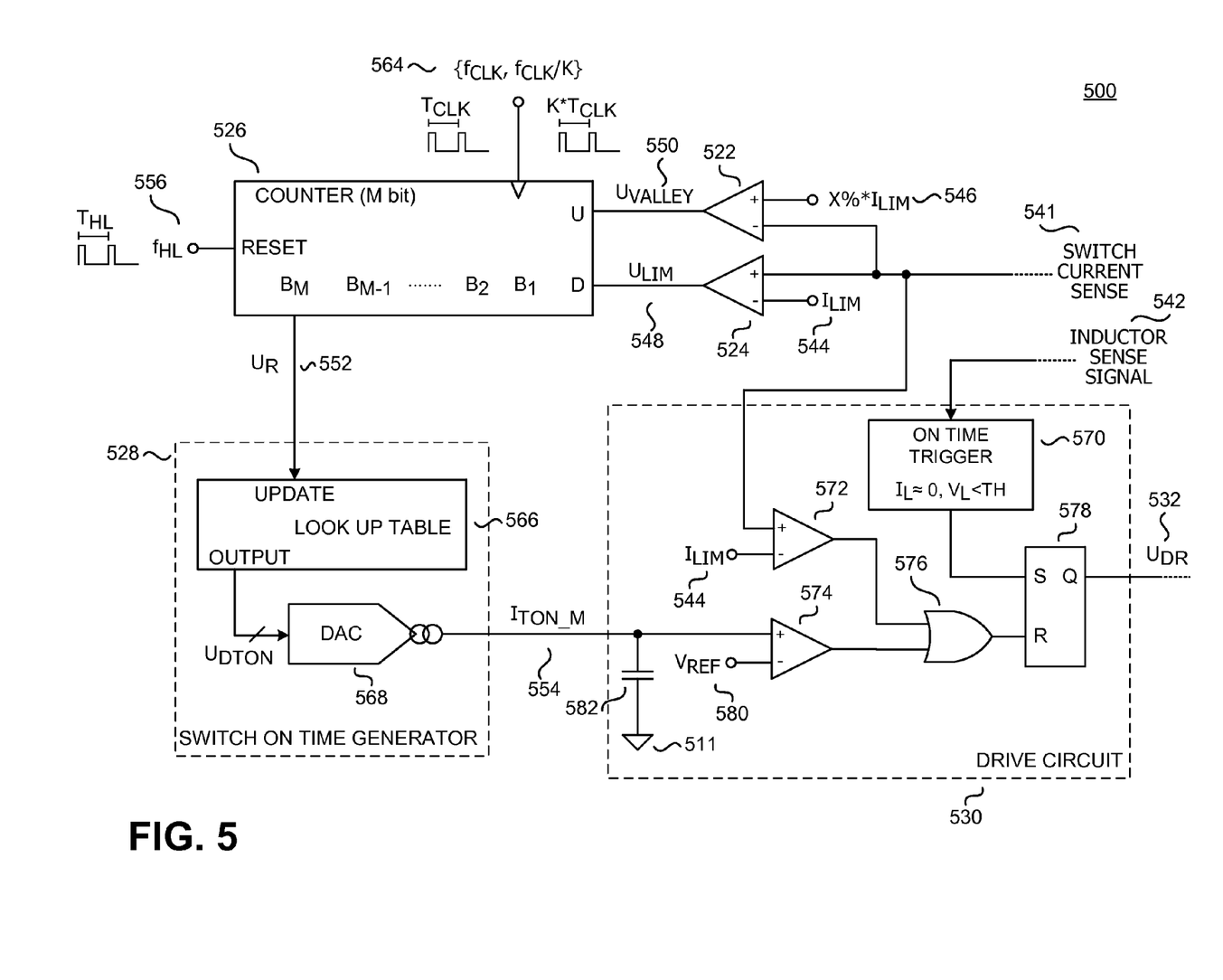
FIG. 5 is a functional block diagram of an example controller of FIG. 1 for determining an on-time threshold in response to the ratio between a limit section and a valley section, in accordance with an embodiment of the disclosure.

FIG. 5 illustrates an example controller 500, including comparators 522 and 524, ratio determination circuit 526 (illustrated as a counter 526), on-time generator 528, and drive circuit 530. The on-time generator 528 is shown including a lookup table 566 and digital-to-analog converter (DAC) 568. Drive circuit 530 is shown including on-time trigger circuit 570, comparators 572 and 574, OR gate 576, S-R latch 578, and capacitance 582. Further illustrated in FIG. 5 is the drive signal $U_{DR}$ 532, switch current sense signal 541, inductor sense signal 542, current limit $I_{LIM}$ 544, valley limit X % $I_{LIM}$ 546, limit signal $U_{LIM}$ 548, valley signal $U_{VALLEY}$ 550, ratio signal $U_R$ 552, on-time threshold $U_{TON\_M}$ 554, half line cycle $T_{HL}$ 556, clock signal $T_{CLK}$, and reference voltage $V_{REF}$ 580.

In one example, the controller 500 operates in critical mode and turns on the power switch when the energy across the energy transfer element is substantially zero. The drive circuit 530 is illustrated as including an on time trigger circuit 570 which receives the inductor sense signal 542 and determines whether the energy across the energy transfer element L1 is substantially zero when the inductor current $I_L$ is substantially equal to zero or the inductor voltage $V_L$ is less than a threshold value. As illustrated, the drive circuit 530 further includes a latch 578 which is coupled to receive the output of the on time trigger circuit 570 (at the S-input) and outputs the drive signal $U_{DR}$ 532. In operation, when the on time trigger circuit 570 determines the energy across the energy transfer element L1 is substantially zero, the latch 578 is set and the drive signal $U_{DR}$ 532 transitions to a logic high value and turns on the power switch.

The latch 578 may be reset to turn off the power switch in response to the switch current sense signal 541 or the on-time threshold $U_{TON\_M}$ 554. The drive circuit includes comparators 572 and 574. Comparator 572 is coupled to receive the switch current sense signal 541 (at the non-inverting input) and the current limit $I_{LIM}$ 544 (at the inverting input). Comparator 574 is coupled to receive the on-time threshold $U_{TON\_M}$ 554 (at the non-inverting input) and the reference voltage $V_{REF}$ 580 (at the inverting input). The outputs of comparators 572 and 574 are coupled to the inputs of OR gate 576. The output of the OR gate 576 is received by the latch 578 (at the R-input). The drive circuit 530 turns off the power switch when the sensed switch current $I_{SW}$ (which may be provided by the inductor sense signal 542 or the switch current sense signal 541) has reached the current limit $I_{LIM}$ 544 or the on-time of the power switch has reached the on-time threshold $U_{TON\_M}$ 554. In the example illustrated in FIG. 5, the latch 578 is reset when the sensed switch current $I_{SW}$ provided by the switch current sense signal 541 has reached the current limit $I_{LIM}$ 544 or when the current signal of the on-time threshold $I_{TON\_M}$ 554 has reached the reference voltage $V_{REF}$ 580.

As illustrated, the drive circuit 530 also includes the capacitance 582 and return 511. The capacitance 582 is coupled to the non-inverting input of comparator 574 and the return 511. In one example, the on-time threshold $I_{TON\_M}$ 554 received by the drive circuit 520 may be a current signal. The speed at which the capacitance 582 charges is partially determined by the value of the current signal of the on-time threshold $I_{TON\_M}$ 554. The greater the value, the faster the capacitor 582 charges and the faster the voltage across the capacitance 582 reaches the reference voltage $V_{REF}$ 580 and the latch 578 is reset. As such, a larger value of the current signal of the on-time threshold $I_{TON\_M}$ 554 results in a shorter on-time threshold of the power switch and vice versa. In other words, the time it takes for the voltage across the capacitance 582 to reach the reference voltage $V_{REF}$ 580 is substantially the on-time threshold. As such, the current signal of the on-time threshold $I_{TON\_M}$ 554 is representative of the on-time threshold since the value of the current signal 554 determines the length of time it takes for the voltage across the capacitance 582 to reach the reference voltage $V_{REF}$ 580. The voltage across the capacitance 582 reaching the reference voltage $V_{REF}$ 580 indicates that the on-time threshold $T_{ON\_M}$ has been reached and the output of the comparator 574 is substantially logic high, which resets the latch 578 and turns off the power switch.

The value of the current signal of the on-time threshold $I_{TON\_M}$ 554 (and as such the on-time threshold) may be determined by comparing the ratio between the limit section and the valley section. Controller 520 further includes comparators 522 and 524 and the limit to valley ratio determination block 526. Comparators 522 and 524 are coupled to receive the switch current sense signal 541 (at the inverting and non-inverting inputs, respectively). Although, it should be appreciated that the inductor sense signal 542 may also be representative of the switch current $I_{SW}$ 134 and the comparators 522 and 524 may receive the inductor sense signal 542. Similar to above, comparators 522 and 524 receive the valley limit X % $I_{LIM}$ 546 and the current limit $I_{LIM}$ 544 at the non-inverting and inverting inputs, respectively. The output of comparator 522 may be referred to as the valley signal $U_{VALLEY}$ 550 and is representative of the amount of time which the peak switch current $I_{SW}$ is less than the valley limit X % $I_{LIM}$ 546. The output of comparator 524 may be referred to as the limit signal $U_{LIM}$ 548 and may be representative of the amount of time which the peak switch current $I_{SW}$ reaches the current limit $I_{LIM}$ 544.

The limit to valley ratio determination block 526 shown in FIG. 5 may be exemplified as an M bit counter 526. The counter 526 has an internal count exemplified as bits BM, BM–1, . . . B2, B1 with BM as the most significant bit (MSB) and B1 as the least significant bit (LSB). In the example shown, the counter 526 receives the valley signal $U_{VALLEY}$ 550 at its up-input (U) and receives the limit signal $U_{LIM}$ 548 at it's down-input (D). The counter 526 decrements its internal count when a logic high value is received at its down-input (D) and increments its internal count when a logic high value is received at its up-input (U). In other words, the counter 526 increments its internal count when the valley signal $U_{VALLEY}$ 550 is logic high and decrements its internal count when the limit signal $U_{LIMIT}$ 548 is logic high. In one example, the internal count of the counter 526 is preset/reset to half the total value of the counter 526. For an example of an 8-bit counter, the counter would be preset/reset to 128 so that one count up or down would toggle the MSB of the 8-bit counter.

The speed at which the counter 526 increments and decrements its internal value is controlled by the clock signal 564 received at its clock-input. The clock signal 564 may have a pulsed waveform which increases to a logic high value and quickly falls to the logic low value. The time between leading edges may be the frequency of the clock signal 564. In the example shown, the clock signal 564 may have two frequencies, clock frequency $f_{CLK}$ and a divided clock frequency $f_{CLK}/K$. When the frequency is substantially the clock frequency $f_{CLK}$, the time between leading edges is the clock period Tux. When the frequency is substantially the divided clock frequency $f_{CLK}/K$, the time between leading edges is the multiple of the clock period $K*T_{CLK}$. The value for K may be substantially the wanted ratio between the limit signal $U_{LIM}$ 548 and the valley signal $U_{VALLEY}$ 550.

In one example, the frequency of the clock signal 564 is substantially the clock frequency $f_{CLK}$ when the valley signal $U_{VALLEY}$ 550 is logic high and the frequency of the clock signal 564 is substantially the divided clock frequency $f_{CLK}/K$ when the limit signal $U_{LIM}$ 548 is logic high. As such, the speed at which the counter 526 increments is K times faster than the speed at which the counter 526 decrements. The counter 526 resets at the end of the half line cycle $T_{HL}/f_{HL}$ 556 received at the reset input of the counter. The MSB BM is outputted from the counter 526 as the ratio signal $U_R$ 552. If the ratio between the limit signal $U_{LIM}$ 548 and the valley signal $U_{VALLEY}$ 550 is greater than the ratio K (and as such the counter 526 counted down more than it counted up) then bit BM (and therefore the ratio signal $U_R$ 552) is logic low. If the ratio between the limit signal $U_{LIM}$ 548 and the valley signal $U_{VALLEY}$ 550 is less than the ratio K (and as such the counter counted up more than it counted down), then bit BM (and therefore the ratio signal $U_R$ 552) is logic high. As mentioned above, the internal count of the counter 526 is preset/reset to half the total value of the counter 526 such that the MSB BM is toggled when the ratio between the limit signal $U_{LIM}$ 548 and the valley signal $U_{VALLEY}$ 550 is above or below K.

The switch on time generator 528 is illustrated as including a lookup table 566 and a DAC 568. The switch on-time generator 528 may increase or decrease the on-time threshold in response to the received ratio signal $U_R$ 552. For the example shown, the lookup table 566 may store values for the on-time threshold. Each stored value is associated with (or corresponds to) an address (or state) of the lookup table 566. The ratio signal $U_R$ 552 may be received at an update-input of the lookup table 566. The address (or state) which the lookup table 566 is in may be updated by the ratio signal $U_R$ 552. In one example, a logic high value for the ratio signal $U_R$ 552 (indicating that the ratio between the limit signal $U_{LIM}$ 548 and the valley signal $U_{VALLEY}$ 550 is less than the ratio K) may trigger the lookup table 566 to increase state, and therefore increment the value for the on-time threshold. A logic low value for the ratio signal $U_R$ 552 (indicating that the ratio between the limit signal $U_{LIM}$ 548 and the valley signal $U_{VALLEY}$ 550 is greater than the ratio K) may trigger the lookup table 566 to decrease state, and therefore decrease the value for the on-time threshold. The digital representation of the on-time threshold is outputted to the DAC 568 as signal $U_{DTON}$.

In the figure shown, the DAC 568 receives the signal $U_{DTON}$ and outputs a current signal $I_{TON\_M}$ 554 representative of the on-time threshold. For the example shown, a larger value of the current signal of the on-time threshold $I_{TON\_M}$ 554 results in a shorter on-time threshold of the power switch and vice versa. In other words, the time it takes for the voltage across the capacitance 582 to reach the reference voltage $V_{REF}$ 580 is substantially the on-time threshold. As such, the current signal of the on-time threshold $I_{TON\_M}$ 554 is representative of the on-time threshold since the value of the current signal 554 determines the length of time it takes for the voltage across the capacitance 582 to reach the reference voltage $V_{REF}$ 580. The voltage across the capacitance 582 reaches the reference voltage $V_{REF}$ 580 indicates that the on-time threshold $T_{ON\_M}$ has been reached and the output of the comparator 574 is substantially logic high, which resets the latch 578 and turns off the power switch.

Figure 6:
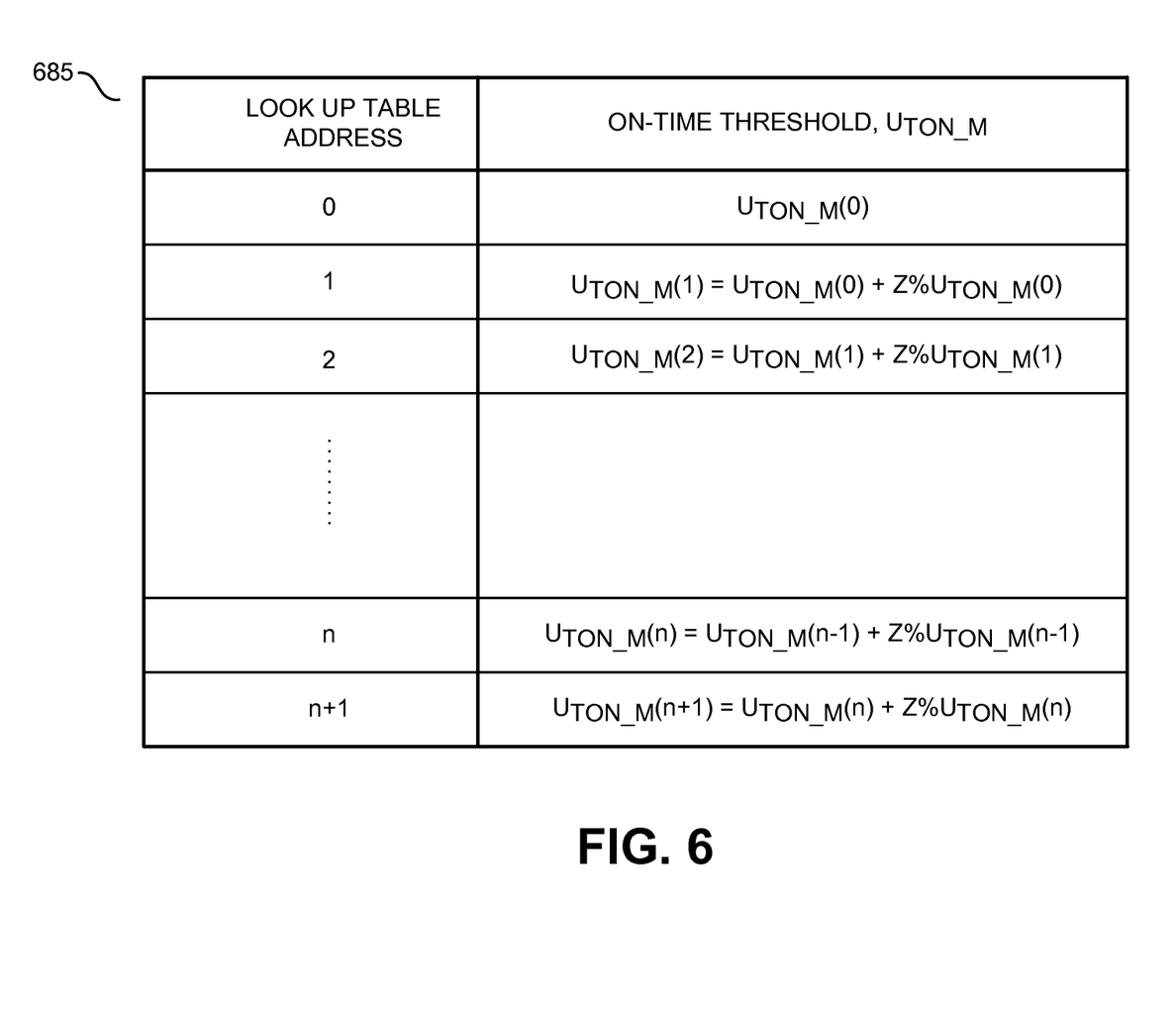
FIG. 6 is a chart illustrating an example lookup address table of FIG. 5, in accordance with an embodiment of the disclosure.

FIG. 6 illustrates an example lookup table 685, which may be one example of lookup table 566 shown in FIG. 5. At address 0, the value of the on-time threshold may be represented as $U_{TON\_M}(0)$. At address 1, the value of the on-time threshold may be the sum of the value of the on-time threshold at the previous address (address 0) and a percentage (Z %) of the value of the on-time threshold at the previous address, or in other words: $U_{TON\_M}(1) = U_{TON\_M}(0) + Z\% \, U_{TON\_M}(0)$. In on example, the percentage Z may be substantially equal to two. For each increase of address, the value of the on-time threshold associated with the current address may be the sum of the value of the on-time threshold at the previous address and a percentage (Z %) of the value of the on-time threshold at the previous address, or: $U_{TON\_M}(n) = U_{TON\_M}(n-1) + Z\% \, U_{TON\_M}(n)$. As such, in one example the change between states may not be constant. In another example, the change between states may be constant.

Figure 7A:
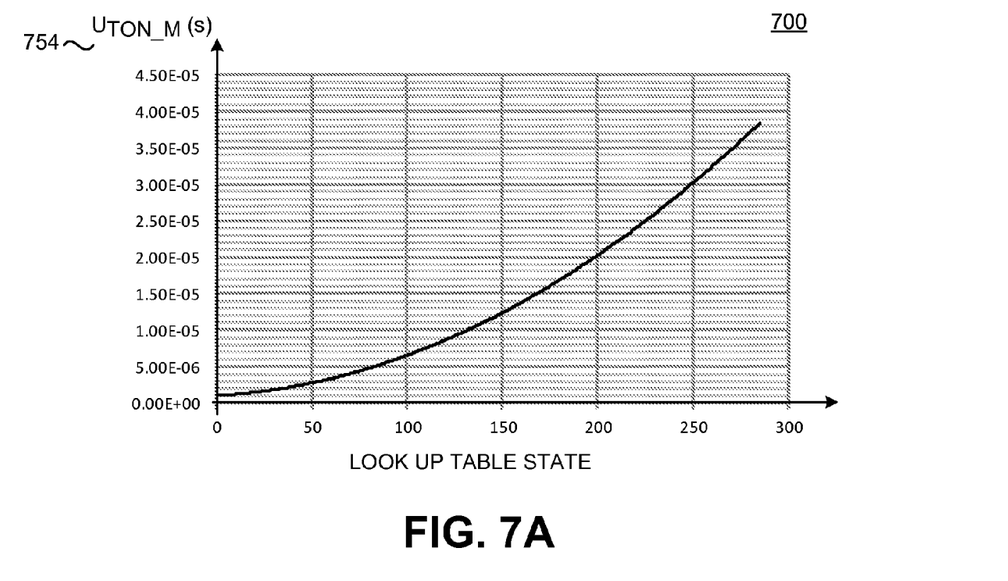
FIG. 7A is a graph illustrating an example on-time threshold with the various states of the lookup address table of FIG. 5, in accordance with an embodiment of the disclosure.
Figure 7B:
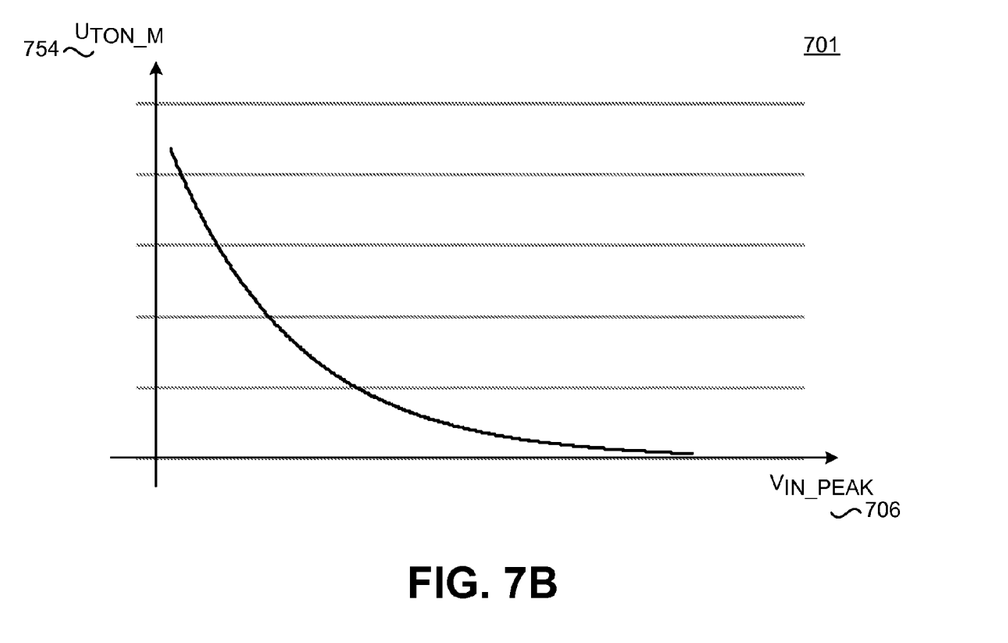
FIG. 7B is a graph illustrating an example on-time threshold with the value of the peak input-voltage, in accordance with an embodiment of the disclosure.

FIG. 7A is a graph 700 illustrating an example waveform of the on-time threshold with the various states of an example lookup address table. As illustrated, the on-time threshold 754 increases as the address/state increases. In addition, the waveform shown for the on-time threshold 754 is non-linear. FIG. 7B shows a graph 701 which illustrates how the on-time threshold 754 may vary with the peak input voltage $V_{IN\_PEAK}$ 706 received by the power converter. As the peak input voltage $V_{IN\_PEAK}$ 706 increases, the on-time threshold 754 determined by the controller may decrease.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A switched mode power converter comprising:
   a switch;
   an energy transfer element coupled to the switch; and
   a controller coupled to the switch to regulate an output of the switched mode power converter, wherein the controller includes:
   limit-to-valley ratio circuitry coupled to generate a ratio signal in response to sensing a switch current of the switch, wherein the ratio signal is representative of a time ratio between a first length of time that the switch current is at or above a switch current limit and a second length of time that the switch current is at or below a switch current valley that is a portion of the switch current limit;
   an on-time generator coupled to vary a switch on-time signal in response to receiving the ratio signal; and
   a drive circuit coupled to output a drive signal to a control terminal of the switch in response to receiving the switch on-time signal.

2. The switched mode power converter of claim 1, wherein the limit-to-valley circuitry comprises:
   a limit comparator coupled to output a limit signal when the switch current is at or above the switch current limit;
   a valley comparator coupled to output a valley signal when the switch current is at or below the switch current valley; and
   a counter coupled to increment a count of the counter in response to the valley signal and decrement the count in response to the limit signal, wherein the counter outputs a Most-Significant-Bit ("MSB") of the count as the ratio signal.

3. The switched mode power converter of claim 2, wherein the incrementing and the decrementing of the count is controlled by a clock signal, and wherein a frequency of the clock signal is a first frequency when the valley signal is outputted by the valley comparator and the frequency of the clock signal is a second frequency when the limit signal is outputted by the limit comparator.

4. The switched mode power converter of claim 3, wherein a frequency ratio of the first frequency of the clock signal to the second frequency of the clock signal drives the time ratio toward the frequency ratio.

5. The switched mode power converter of claim 1, wherein the drive circuit is also coupled to generate the drive signal in response to sensing the switch current.

6. The switched mode power converter of claim 1, wherein the drive circuit is coupled to sense energy stored in the energy transfer element, and wherein the drive circuit is configured to operate in a critical conduction mode where the switch is only enabled by the drive signal upon the energy in the energy transfer element reaching zero.

7. The switched mode power converter of claim 6, wherein the drive circuit includes a latch and an on-time trigger coupled to sense a current through the energy transfer element, the on-time trigger coupled to set the latch when the current through the energy transfer element reaches zero, and wherein the drive signal is on an output of the latch.

8. The switched mode power converter of claim 1, wherein the on-time generator includes a lookup table coupled to increase or decrease a state of the lookup table in response to receiving the ratio signal, wherein the on-time generator outputs an analog value in response to the state of the lookup table.

9. The switched mode power converter of claim 8, wherein the state of the lookup table corresponds to a sum of a previous analog value corresponding to a previous state and a percentage of the previous analog value.

10. The switched mode power converter of claim 1, wherein the drive circuit includes a latch coupled to output the drive signal, wherein the drive circuit is configured to reset the latch in response to at least one of (1) the switch current reaching the switch current limit and (2) the switch on-time signal reaching an on-time threshold.

11. The switched mode power converter of claim 10, wherein the controller turns off the switch when the switch current has reached the on-time threshold.

12. The switched mode power converter of claim 10, wherein the on-time threshold is adjusted at a half line cycle.

13. The switched mode power converter of claim 10, wherein the controller turns off the switch when the switch current has reached the current limit.

14. A controller for a switched mode power converter comprising:
   limit-to-valley ratio circuitry coupled to generate a ratio signal in response to sensing a switch current of a switch of the switched mode power converter that regulates an output of the switched mode power converter, wherein the ratio signal is representative of a time ratio between a first length of time that the switch current is at or above a switch current limit and a second length of time that the switch current is at or below a switch current valley that is a portion of the switch current limit;
   an on-time generator coupled to vary a switch on-time signal in response to receiving the ratio signal; and
   a drive circuit coupled to output a drive signal to a control terminal of the switch in response to receiving the switch on-time signal.

15. The controller of claim 14, wherein the drive circuit is also coupled to generate the drive signal in response to sensing the switch current.

16. The controller of claim 14, wherein the drive circuit is coupled to sense energy stored in an energy transfer element of the switched mode power converter, and wherein the drive circuit is configured to operate in a critical conduction mode where the switch is only enabled by the drive signal upon the energy in the energy transfer element reaching zero.

17. The controller of claim 16, wherein the drive circuit includes a latch and an on-time trigger coupled to sense a current through the energy transfer element, the on-time trigger coupled to set the latch when the current through the energy transfer element reaches zero, and wherein the drive signal is on an output of the latch.

18. The controller of claim 14, wherein the on-time generator includes a lookup table coupled to increase or decrease a state of the lookup table in response to receiving the ratio signal, wherein the on-time generator outputs an analog value in response to the state of the lookup table.

19. The controller of claim 18, wherein the analog value of the state is a sum of a previous analog value of a previous state and a percentage of the previous analog value.

20. The controller of claim 14, wherein the drive circuit includes a latch coupled to output the drive signal, wherein the drive circuit is configured to reset the latch in response to at least one of (1) the switch current reaching the switch current limit; and (2) the switch on-time signal reaching an on-time threshold.

21. The controller of claim 20, wherein the controller turns off the switch when the switch current has reached the on-time threshold.

22. The controller of claim 20, wherein the on-time threshold is adjusted at a half line cycle.

23. The controller of claim 20, wherein the controller turns off the switch when the switch current has reached the current limit.

24. The controller of claim 14, wherein the limit-to-valley circuitry comprises:
   a limit comparator coupled to output a limit signal when the switch current is at or above the switch current limit;
   a valley comparator coupled to output a valley signal when the switch current is at or below the switch current valley; and
   a counter coupled to increment a count of the counter in response to the valley signal and decrement the count in response to the limit signal, wherein the counter outputs a Most-Significant-Bit ("MSB") of the count as the ratio signal.

25. The controller of claim 24, wherein the incrementing and the decrementing of the count is controlled by a clock signal, and wherein a frequency of the clock signal is a first frequency when the valley signal is outputted by the valley comparator and the frequency of the clock signal is a second frequency when the limit signal is outputted by the limit comparator.

26. The controller of claim 25, wherein a frequency ratio of the first frequency of the clock signal to the second frequency of the clock signal drives the time ratio toward the frequency ratio.

\* \* \* \* \*